July 14, 1964  D. B. SPALDING  3,140,928
PRESSURE EXCHANGER HEAT PUMP APPARATUS
Original Filed March 19, 1956

INVENTOR
Dudley Brian Spalding
BY
Larson and Taylor
ATTORNEY

United States Patent Office
3,140,928
Patented July 14, 1964

3,140,928
PRESSURE EXCHANGER HEAT PUMP
APPARATUS
Dudley Brian Spalding, 2 Vineyard Hill Road,
London SW. 19, England
Original application Mar. 19, 1956, Ser. No. 572,379, now
Patent No. 2,971,343, dated Feb. 14, 1961. Divided
and this application Dec. 9, 1960, Ser. No. 74,942
4 Claims. (Cl. 34—62)

This invention relates to heat pump plant including a pressure exchanger and a heat-exchanger.

The present application is a division of application Serial No. 572,379, filed March 19, 1956, now Patent No. 2,971,343, dated February 14, 1961.

The term "pressure exchanger" is used herein to mean apparatus comprising cells in which one fluid quantity expands, so compressing another fluid quantity with which it is in contact, ducting to lead fluid substantially steadily to and from the cells at different pressures and means to effect relative motion between the cells and the ducting.

The cells of a pressure exchanger are usually arranged in a circular array as a rotor and this rotor is customarily termed a "cell ring."

In a pressure exchanger two streams of fluid, one at a low pressure and one at a higher pressure may be introduced into the cells and these streams may be combined into a single stream of fluid leaving an outlet from the pressure exchanger cells at a pressure intermediate the low and higher pressures. Such a pressure exchanger is hereinafter referred to as a "pressure equalizer."

According to the present invention a heat pump plant including a pressure exchanger and a heat-exchanger incorporates cells for the compression and expansion of fluid, the cells having open ends, means defining common end-walls for the cells and a series of ducts communicating with the cells at circumferentially spaced ports in the end-walls, means for producing relative motion between the cells and the end-walls, the series of ducts including an inlet duct to lead low-pressure fluid to the cells, an inlet duct to lead higher-pressure fluid to the cells, an inlet duct to lead fluid from the cells at a pressure intermediate the low and higher pressures, the heat-exchanger including a hot pass, an inlet for the hot pass communicating with the outlet duct of the series of ducts, a cold pass, means to introduce to the heat-exchanger material to be heat processed by heat derived from the hot pass and to remove at least part of the processed material from the heat-exchanger, an outlet from the cold pass communicating with the inlet duct of the series of ducts for the admission of low-pressure fluid to the cells, and an outlet for the hot pass.

Embodiments of a heat pump plant in accordance with the invention will now be described, by way of example, with reference to the accompanying diagrammatic drawing, in which.

Figure 1:
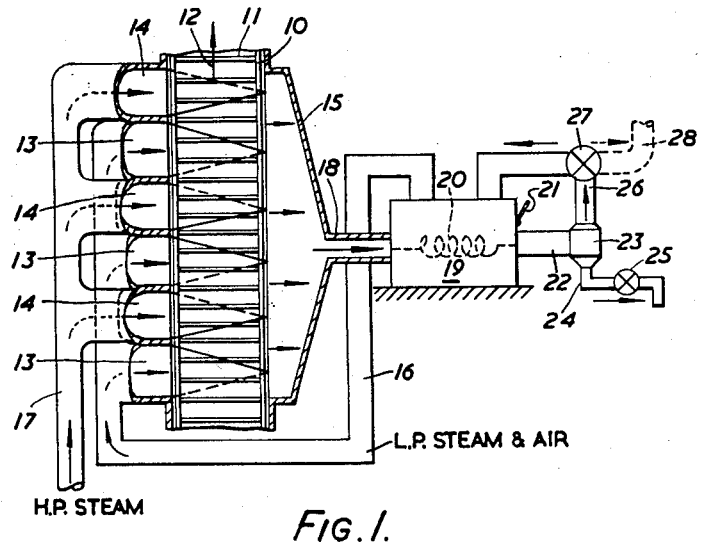
FIGURE 1 shows a developed view of a pressure equalizer forming a part of a heat pump plant drying apparatus.

Referring to FIGURE 1, a pressure equalizer includes a cell ring 10 having a series of identical cells 11 for the compression and expansion of a fluid. For the sake of clarity the cell ring is shown as a developed view. The cell ring 10 is rotated in the direction indicated by an arrow 12. At one end of the cell ring a plurality of ducts 13 admit low-pressure fluid to the cells. At the same end of the cells a similar number of ducts 14 admit higher-pressure fluid to the cells. The ducts 13 and 14 are arranged alternately around the cell ring. At the end of the cell ring 10 remote from the inlet ducts 13 and 14 a large duct or collector 15 serves to lead from the cells fluid at a pressure intermediate the low and the higher pressures. A duct 16 is in communication with each of the ducts 13 and a duct 17 is in communication with each of the ducts 14.

A duct 18 extends from an outlet of the collector 15 to an inlet to the hot pass of a heat-exchanger in the form of a drying chamber 19. The hot pass of the heat-exchanger or heating coil is indicated by a broken line 20. The drying chamber 19 is provided with means 21 to introduce material to be heat processed by the heat derived from the hot pass and to remove the processed material. The means 21 is in the form of a door in a wall of the drying chamber. The heating coil 20 is connected through its outlet via a duct 22 to a liquid separator 23. A drain outlet 24 provided with a valve 25 serves to lead liquid away from the separator 23. An outlet duct 26 of the separator 23 communicates with a throttle valve 27 which in turn communicates with the inlet of the cold pass of the drying chamber 19. The outlet of the cold pass of the drying chamber 19 exhausts to the duct 16.

In operation, material to be dried is supplied to the drying chamber 19 by means of the door 21 and is heated by the fluid passing through the heating coil 20 and the vapour driven off is exhausted from the chamber and passes through the duct 16 to the three inlet ducts 13 for leading low-pressure steam and air to the cell ring of the pressure equalizer. High-pressure steam derived from a boiler (not shown) is admitted to the cell ring 10 through the duct 17 and the three ducts 14. The effect of supplying low and higher pressure fluids through the low and higher pressure ducts 13 and 14 alternately is to provide at the end of the cell ring remote from the inlet ducts a fluid, in this case steam and air, at a fairly constant intermediate pressure. This fluid passes through the collector 15 and the duct 18 to the heating coil 20 within the drying chamber 19. After passage through the heating coil 20 the fluid passes through the duct 22 to the liquid separator 23. Condensed steam is drained off through the drain 24 and the valve 25 and is returned to the boiler (not shown) as feed water. Air discharged from the separator through the duct 26 is throttled in the throttle valve 27 and is returned to the drying chamber 19 where it takes up vapour. The cycle then recommences.

In one modification of the plant, the air from the throttle valve 27 is allowed to escape to atmosphere through a duct 28 (broken lines). Fresh air is in this case drawn into the cold pass of the drying chamber.

In another modification the air from the throttle valve is returned directly to the rotor. Again a fresh air supply is provided for the drying chamber.

Figure 2:
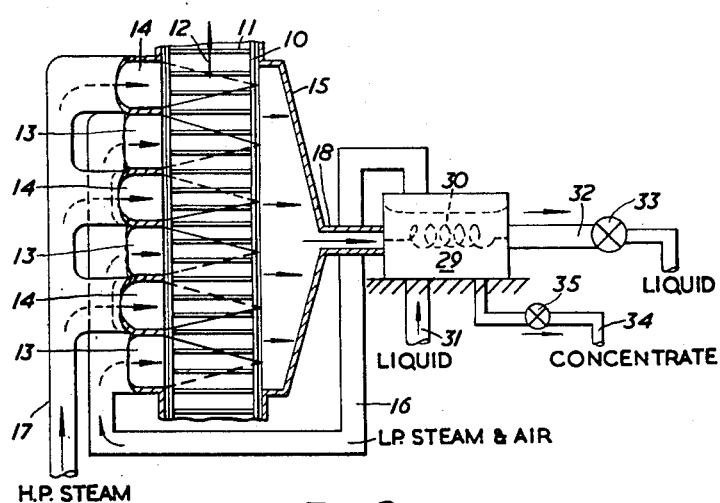
FIGURE 2 shows a developed view of a pressure equalizer forming a part of a heat pump plant distillation apparatus.

Referring to FIGURE 2, the pressure equalizer and its associated ducting are identical with the arrangement shown in FIGURE 1 and are given the same reference numerals. A distillation chamber 29 is provided with a heating coil indicated as a broken line at 30. The heating coil 30 forms the hot pass of the chamber. The inlet duct 16 to the pressure exchanger communicates with an outlet of the cold pass of the chamber and the duct 18 from the pressure exchanger is connected to the inlet of the hot pass or heating coil 30. The cold pass of the distillation chamber 29 is provided with means 31 and 34 repectively to introduce material to be heat processed by the heat derived from the hot pass and to remove the processed material. The means 31 is an inlet to the cold pass of the chamber for liquid to enter the chamber. The means 34 is an outlet which is controlled by a valve 35. An outlet duct 32 is connected to the outlet of the heating coil or hot pass 30. A reducing valve 33 is interposed along the length of the duct 32.

The heat in the distillation chamber is provided by the medium-pressure steam and vapour received from the pressure equalizer via the duct 18 passing through the heating coil 30. This heat drives off low-pressure vapour from the liquid supplied to the cold pass via the inlet 31. The low-pressure vapour is returned to the pressure equalizer via the duct 16. The concentrate is removed from the chamber through the duct 34, the flow being controlled by the valve 35 and liquid, condensed following transfer of heat from the medium-pressure steam and vapour to the liquid in the cold pass, is taken off through the duct 32 via the reducing valve 33. This arrangement may be applied to a distillation process for example, the separation of pure water from brine or more generally the separation of one constituent from a liquid having two constituents with different boiling points.

What I claim is:

1. Heat pump plant including a heat-exchanger and a pressure exchanger incorporating cells for the compression and expansion of fluid, the cells having open ends, means defining end-walls for the cells, a series of ducts communicating with the cells at circumferentially spaced ports in the end-walls, means for producing relative motion between the cells and the end-walls, the series of ducts including an inlet duct to lead a stream of low-pressure fluid to the cells, an inlet duct to lead a stream of higher-pressure fluid to the cells, the streams of low- and higher-pressure being combined in the cells into a single stream of fluid at a pressure intermediate the low- and higher-pressures, an outlet duct to lead the single stream of intermediate pressure fluid from the cells, the heat-exchanger including a hot pass, an inlet for the hot pass communicating with the outlet duct of the series of ducts, a cold pass, an outlet from the cold pass communicating with the inlet duct of the series of ducts for the admission of low-pressure fluid to the cells, and means to introduce to the heat-exchanger material to be heat processed by heat derived from the hot pass and to remove at least part of the processed material from the heat-exchanger.

2. Heat pump plant as claimed in claim 1, in which the heat-exchanger takes the form of a drying chamber and the plant further includes a liquid separator, an inlet for the separator communicating with the outlet of the hot pass of the heat-exchanger, an outlet for the separator communicating with the inlet of the cold pass of the heat-exchanger, throttle means interposed between the outlet of the separator and the cold pass inlet, and a drain outlet of the separator for the separated liquid.

3. Heat pump plant as claimed in claim 1, in which the heat-exchanger is in the form of a distillation chamber, and the means to supply to the cold pass of the heat-exchanger material to be heat processed and to remove from the cold pass the processed material takes the form of an inlet to the distillation chamber for the supply of a liquid to be distilled and an outlet from the distillation chamber for the removal of the processed material.

4. Heat pump plant as claimed in claim 1, comprising a plurality of inlet ducts for admitting low pressure fluid to the cells and a plurality of inlet ducts for admitting higher pressure fluid to the cells the low and higher pressure ducts being arranged alternately around the cell ring.

References Cited in the file of this patent
UNITED STATES PATENTS
2,852,915    Jendrassik _____ Sept. 23, 1958